(12) United States Patent
Yamada et al.

(10) Patent No.: US 6,255,388 B1
(45) Date of Patent: Jul. 3, 2001

(54) SHRINK FILM AND METHOD OF MAKING THE SAME

(75) Inventors: Hirofumi Yamada, Ichihara; Yoshiaki Murata, Chiba; Hidetsugu Sawada, Chiba; Kosuke Arai, Chiba, all of (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/253,769

(22) Filed: Feb. 22, 1999

(30) Foreign Application Priority Data

Feb. 24, 1998 (JP) .................................................. 10-041948

(51) Int. Cl.$^7$ .................................................. C08G 63/91
(52) U.S. Cl. .............................. 525/71; 525/84; 264/165; 264/DIG. 73
(58) Field of Search ........................ 525/71, 84; 264/165, 264/DIG. 73

(56) References Cited

U.S. PATENT DOCUMENTS 5,132,074 * 7/1992 Isozaki et al. ........................ 264/564

FOREIGN PATENT DOCUMENTS 4-202310   7/1992 (JP) .
408034861 * 2/1996 (JP) .

* cited by examiner

Primary Examiner—Rachel Gorr
(74) Attorney, Agent, or Firm—Armstrong, Westerman, Hattori, McLeland & Naughton, LLP

(57) ABSTRACT

A shrink film is provided which is superior in glossiness, mechanical strength, and rigidity, and which is also provided with a property of preventing natural shrinkage. The shrink film with excellent properties is produced by using a resin composition which is obtained by graft polymerization of copolymers of styrene and butadiene with styrene, methylmethacrylate, and butylacrylate. The thus obtained resin composition is extruded after melting and kneading, and drawn into a film in two directions, and exposed at a temperature within a temperature range for the thermal setting so as to obtain the orientation according to ASTM D1504 of the shrink film in range of 1.5 to 5.0 MPa.

13 Claims, No Drawings

SHRINK FILM AND METHOD OF MAKING THE SAME

BACKGROUND OF THE INVENTION

1. Field of the Invention

This invention relates to a shrink film which contains essential components of rubber-modified styrene resins consisting of a gum polymer, a styrene-based monomer, and an alkylester(meth)acrylate, and a method of making the same. The shrink film thus obtained exhibits excellent shrinking properties suitable in the shrink packaging and labeling fields such as a lower shrink starting temperature and a larger shrinkage rate, and an improved dimensional change in the shrinking direction at room temperature (natural shrinkage). The shrink film further exhibits high glossiness, and high transparency, and possesses desirable mechanical properties and an excellent applicability to the packaging machines due to its high rigidity, and the desirable property of preventing whitening from occurring at bent portions.

2. Background Art

Conventionally, shrink films produced by polyvinyl chlorides are widely used as films for the shrink packaging due to their shrinkage properties, mechanical strength, and transparency. However, the material for shrink films has changed to styrene-butadiene copolymers, because of environmental problems due to the generation of hydrochloride gas caused by incineration of polyvinyl chlorides.

Recently, stimulated by the development of PET bottles, various shrink films provided with improved shrinkage at lower temperatures and improved mechanical properties have been developed by a method of mixing a styrene-based resin with a styrene-butadiene block copolymer, or by a method of controlling the styrene content in the styrene-butadiene copolymer or of controlling the degree of polymerization of the styrene-butadiene copolymer.

For example, JP-A-2-14186 and JP-A-2-55218 disclose shrink films in which a particular low molecular polystyrene is incorporated in a block copolymer composed of vinyl aromatic hydrocarbon and conjugated dienes. However, any shrink films composed of those block copolymers are liable to undergo natural shrinkage, and are also liable to be inferior in transparency of the film after forming the film.

Therefore, conventionally, JP-A-8-34861 disclosed a new type of styrene-based shrink film made by drawing a resin obtained by graft-polymerization of a gum polymer, a styrene-based monomer, and alkylester (meth)acrylate such that the gum polymer occupies the resin at an ratio of 1 to 20% by weight. The thus obtained resin film exhibits good properties in transparency, glossiness, and in mechanical strength, and the film exhibits good shrinkage properties such as shrinkage at low temperature and a property to prevent natural shrinkage.

However, the shrink film disclosed by JP-A-8-34861 has a drawback in that it is still likely to undergo natural shrinkage, although it is superior in mechanical strength or in rigidity, as well as in surface glossiness.

Therefore, it is the object of the present invention to provide a shrink film and to provide a method of making the same which is superior in the surface glossiness and in mechanical properties such as the mechanical strength and rigidity as well as the property of preventing natural shrinkage.

This invention was completed by the authors after a series of investigations by discovering that an excellent shrink film can be made by the use of an essential component of a grafted copolymer obtained by the graft-polymerization of styrene monomers and alkylester(meth)acrylate to a specific amount of a gum polymer, and by successive processing of a film formation by rolling, and thermal setting for adjusting the film orientation. The thus obtained shrink film possesses desirable properties such as high glossiness, high rigidity, and a property of preventing natural shrinkage.

That is, the present invention relates to a shrink film constructed by a resin composition in which the essential component is composed of a Resin A which is obtained by graft polymerization of a gum polymer (a-1), a styrene-based monomer (a-2), and alkylester(meth)acrylate (a-3), such that the gum polymer comprises 1 to 20% by weight of the Resin A; and the orientation of the film based on ASTM D1504 is controlled to be within a range of 1.5 to 5.0 MPa. Furthermore, the present invention relates also to a method of making a shrink film comprising the steps of: extruding the melted and kneaded resin composition in which the essential component is composed of a Resin A which is obtained by graft polymerization of a gum polymer (a-1), a styrene-based monomer (a-2), and alkylester(meth)acrylate (a-3), such that the gum polymer comprises 1 to 20% by weight of the Resin A; drawing the extruded resin into at least one direction at a temperature range from $(Tg+5°\,C.)$ to $(Tg-15°\,C.)$, where Tg is the glass-transition temperature measured by JIS K-7198; exposing the thus drawn film at an temperature range from $(Tg+50°\,C.)$ to $(Tg-10°\,C.)$ for 2 to 80 seconds.

The resin composition A of the present invention is a resin which is obtained by graft polymerization of a gum polymer (a-1), a styrene monomer (a-2), and alkylester (meth) acrylate (a-3), such that the gum polymer comprises 1 to 20% by weight of the Resin A. If the content of the gum polymer (a-1) is less than 1% by weight, it will be difficult for the resin composition to be extended into a film, and the impact resistance of the shrink film is degraded. In contrast, if the content exceeds 20% by weight, surface irregularities of the film caused by the gum particles increase with increased amounts of the gum polymer, reducing the transparency and the glossiness of the film, and the rigidity of the film is also degraded.

Although the gum polymer is not limited to a specific material, the polymer may include rubber having rubber-like properties at room temperature or thermoplastic elastomers. Practically, the gum polymer used in the present invention includes block-copolymer of styrene-based monomers represented by a styrene-butadiene rubber and diene-based monomers, butadiene rubber (BR), natural rubber (NR), and isoprene rubber (IR).

Among these polymers, from the point of view of obtaining a good balance of properties in transparency and impact resistance, and improved property resistance to whitening by bending, it is preferable to use block copolymers of styrene-based monomers and diene-based monomers, and butadiene rubber (BR), and it is more preferable to use block copolymers of the styrene-based monomers and diene-based monomers.

There is no limitation in selecting block copolymers of styrene-based monomers and diene-based monomers, but it is preferable to use copolymers with a content of the styrene unit is in the range of 30 to 55% by weight, because the properties such as the transparency and the impact resistance will be improved. That is, when the content of the styrene unit is 39% or more than 30% by weight, various properties of the resultant shrink film such as the capability to prevent natural shrinkage, the transparency, and the glossiness are remarkably improved, and the rigidity of the resultant film is improved so as to be more suitable for a packaging machine. In contrast, when the content of the styrene unit is 55% or less than 55% by weight, the impact resistant strength of the resultant film becomes high, and whitening by bending can be further reduced.

The average diameter of gum particles of the gum polymer (a-1) is not limited. However, it is preferable to use a gum polymer having an average diameter of the particles within a range of 0.05 to 0.8 $\mu$m, and more preferably within a range of 0.1 to 0.4 $\mu$m, because the resultant film will be provided with the better impact resistance, better transparency, better glossiness, and better capability of preventing whitening by bending.

Examples of the styrene-based monomers which are used for constructing the copolymers of the styrene-based monomers and the diene-based monomers include styrene, α-methylstyrene, m-methylstyrene, p-methylstyrene, ethylstyrene, isobutylstyrene, tert-butylstyrene, (o-, m-, p-)bromostyrene, (o-, m-, p-)chlorostyrene, and the most preferable example is styrene from the point of view of the transparency.

Examples of the diene-based monomers which are used for constructing the copolymers of the styrene-based monomers and the diene-based monomers include butadiene, chloroprene, isoprene, 1, 3-pentadiene, and the most preferable example is butadiene from the point of view of transparency, impact resistance, the property of preventing natural shrinkage, and whitening by bending.

Addition of alkylester (meth)acrylate (a-3) gives a resultant shrink film having superior transparency and glossiness. Although any alkylester(meth)acrylate may be used without limitation, it is preferable to select methacrylate due to the transparency of the resultant film, such as methyl(meth) acrylate, ethyl(meth)acrylate, and butyl(meth)acrylate.

From among alkylester(meth)acrylates (a-3), it is preferable to polymerize the Resin A by use of a combination of methyl(meth)acrylate or ethyl (meth)acrylate with alkylesteracrylate containing an alkyl group ranging from C4 to C8 and an ester bond, as the grafting component. The Resin A thus produced provides the resultant film with preferable and well-balanced properties in a property to prevent the natural shrinkage and the reduced shrink starting temperature.

Examples of alkylester(meth)acrylate containing an alkyl group ranging from C4 to C8 and an ester bond include n-butyl acrylate, iso-butyl acrylate, and 2-ethylhexyl acrylate, and the most preferable example is the n-butyl acrylate from the points of view of a lower shrink starting temperature, the property of preventing natural shrinkage, as well as glossiness and transparency of the resultant shrink film.

Any method such as bulk-and suspension polymerization and solution polymerization may be used for manufacturing the Resin A without any limitation. However, it is preferable to adopt a method to carry out a continuous bulk polymerization while performing the static stirring in a tubular reactor which is installed in a continuous bulk polymerization line comprising the tubular reactor in which a stirring reactor and a plurality of mixing elements with no moving parts, and the above method is useful for maintaining the polymer composition homogeneous, and for obtaining high transparency and high impact resistance in the resultant film. In the resin composition containing the above described Resin A as the essential component for forming the shrink film of the present invention, it is preferable to incorporate a Resin B at a weight ratio of less than 50% to that of the Resin A. The Resin B is composed of a gum polymer (b1), a styrene-based monomer (b-2), and a acrylic monomer (b-3), and the Resin B is obtained by the graft polymerization such that the gum polymer (b-1) is contained in the Resin B at the ratio of 30% or more than 30% by weight. The shrink film formed by the resin composition of the present invention comprising the Resin A and the Resin B, the content of which is 50% or less than 50% by weight of Resin A, exhibits preferable characteristics such as a low shrink starting temperature, the prevention capability of the natural shrinkage, transparency, glossiness, and rigidity, as well as impact resistance, tearing resistance, and resistance to whitening by bending.

When the Resin B is formed by graft polymerization so that the content of the gum polymer (b-1) is 30% or more than 30% by weight in the resin, the properties of the resin such as impact resistance, tear resistance, and resistance against whitening by bending are drastically improved. It is preferable to set the content of the gum polymer (b-1) in a range of 30 to 90% by weight, and more preferably 50 to 80% by weight from the point of view of a good balance of characteristics in transparency and glossiness.

Regarding the gum polymer (b-1), any gum polymer may be used, but as for the above described gum polymer (a-1), it is preferable to select block copolymers of a styrene-based monomer and a diene-based monomer and a butadiene rubber (BR), and more preferable examples among these copolymers are block copolymers of the styrene-based monomer and the diene-based monomer. Although the bridging density of the gum polymer (b-1) is not limited, it is possible to improve the impact resistance and the tearing resistance by changing the bridging density using chain transfer agents to yield a shrink film with good transparency and good glossiness.

Any styrene-based monomers may be used as the styrene-based monomer (b-2) without any limitation, including the above described styrene-based monomers (a-1) such as styrene, α-methylstyrene, m-methylstyrene, p-methylstyrene, ethylstyrene, isobutylstyrene, tert-butylstyrene, (o-, m-,p-) bromostyrene, (o-, m-, p-)chlorostyrene, and a preferable example is styrene from the point of view of transparency.

Any acrylic monomer (b-3) may be used without limitation. Examples of the acrylic monomer (b-3) include alkylester (meth)acrylates such as methyl(meth)acrylate, ethyl (meth)acrylate, and butyl(meth)acrylate, and (meth) acrylonitrile, and it is preferable to select methyl(meth) acrylate from the point of view of transparency, glossiness, and compatibility with Resin A.

In addition, the Resin B may be copolymerized with unsaturated fatty acids such as maleic anhydride, in order to improve the impact resistance and the resistance to whitening by bending, to obtain acloser refractive index to that of Resin A, and to maintain a higher transparency of the resultant shrink film.

It is preferable to adjust the refractive index of the Resin B comprising the gum polymer (b-1), the styrene-based monomer (b-2), the acrylic monomer (b-3), and other monomers (b-4) added according as necessary to a range of 1.520 to 1.570, and more preferably to a range of 1.535 to 1.555. Any average particle diameters of the grafted polymer may be used, and it is preferable to use an average particle diameter of 0.05 to 0.8 $\mu$m, and more preferably, 0.1 to 0.4 $\mu$m for improving the transparency, impact resistance and capability of preventing whitening by bending.

A preferable method to produce the Resin B is to form core-shell structures by graft polymerizaion of the styrene-based monomer (b-2) and alkylester (meth)acrylate around core particles of the gum polymer (b-1), and the graft polymerization can be executed in the systems of the random bonding and block bonding.

When the Resin A is mixed with the Resin B, the mixing ratio of the Resin B is 50% or less than 50% by weight as described above, and it is more preferable to select a ratio in the range of 5 to 45% in order to obtain a balance of properties of transparency and glossiness. Any mixing method may be used, such as uniaxial or biaxial extruding in a continuous mixing operation, the melting and kneading before film extrusion in a batch mixing operation, and the uniform homogenization by melting and kneading before the extruding film formation by a biaxial extruder.

It is possible to add various plasticizers at a ratio of 8% or less than 8% by weight, more preferably 5% or less than 5% by weight according as necessary to the resin composition containing Resin A as the essential component. Generally, it is preferable to restrict the amount of the plasticizer to 3% or less than 3% by weight, since addition of a plasticizer degrades the E' retention, and the resistance to natural shrinkage.

Any conventional plastizers may be used including monoester-based plasticizers such as phthalate-based, adipate-based, azelaic acid-based, sebacate-based, citrate-based; epoxy derivatives; and polyester-based polymerization-type plasticizers, which have a monovalent alcohol group or a basic acid group at the end; and of these, it is preferable to select phthalate-based plasticizers such as dibutylphthalate (DBP) and dioctylphthalate (DOP), because it is possible to execute fine control of the shrink starting temperature, and to maintain the transparency of the resultant film.

It is preferable to add various additives such as a slip agent, an anti-blocking agent, an antistatic agent, an antioxidant, and an ultraviolet absorbing agent, beside the plasticizers as necessary in a rage of 0.01 to 20% by weight, more preferably 0.01 to 10% by weight, and most preferably 0.01 to 5% by weight.

Various slip agent may be used such as hydrocarbon-based liquid paraffin or polyethylene wax; fatty acid-based higher fatty acid or oxyaliphatic acid; fatty acid amide; ester-based glyceride or ester wax; fatty ketone-type compounds; fatty alcohol-type compounds; partial esters of aliphatic compounds and poly-alcohols; and complex slip agents. It is particularly preferable to use organic polysiloxanes such as liquid paraffin, polyethylene wax, dimethylpolysiloxane, and methylphenylpolysiloxane; bis-fatty acid amides such as ethylenebisstearylamide; and ester waxes such as alkylphosphate, from the points of view of the transparency and the surface smoothness.

Examples of anti-blocking agents include silicon oxide; fine grain silicone, fine grain polystyrene, and fine grain polymethylmethacrylate; fine grain nylon; and fine grain high-density polyethylene. Examples of anti-static agents include fatty acid-type compounds such as sucrose fatty acid ester, glycerin fatty acid ester, sorbitan fatty acid ester, polyglycerin fatty acid ester, and ethyleneoxide addition products; fatty acid amides; fatty acid ketones; fatty acid esters; and cationic active agents; anionic active agents such as alkylsulfosuccinate salt; amphoteric active agents. Examples of anitioxidants include hindered phenolic compounds such as triethyleneglycol-bis- 3-(3-tertiary butyl-5-methyl-4-hydroxyphenyl) propionate; phosphate compounds such as triphenylphospite; and sulfur compounds such as dilaurylthiodipropionate. Examples of ultra-violet light absorbing agents include compounds such as hydroxybenzophenones and hydroxybenzotriazole. These additives may be used alone or in combination and these additives are not limited to the above examples.

The hereinabove described plasticizers and additives may be added by premixing with the Resin A or with the Resin B, may be added at the time of the melting and kneading process, or may be added by mixing with the preformed master batch.

It is preferable that a ratio of E'(45° C.)/E'(23° C.) of the temperature dependent storage modulus (E') in the measurement of the dynamic viscoelasticity of the resin composition containing the Resin A is within a range of 0.85 to 1.00, because release of the inner stress of the resultant film at room temperature is small and the film exhibits superior property of preventing natural shrinkage. That is, when the measured value of the storage modulus E' at 45° C. is 85% or more than 85% measured at 23° C., it is possible to reduce natural shrinkage of the resultant film drastically, and it is also possible to eliminate the dimensional change of the film in a printing operation, and to avoid the case that the film width becomes narrower than the necessary width.

As hereinbefore described, since the Resin A is produced by polymerization of alkylester (meth)acrylates such as methyl(meth)acrylate or ethyl(meth)acrylate with the graft component of alkylester (meth)acrylate having an alkyl group ranging from $C_4$ to $C_8$ with an ester bond, it is possible to reduce the shrink starting temperature, while maintaining the property of prevention of natural shrinkage. In this case, it is preferable that the resin composition containing the Resin A to the composition is one having a temperature range of 50 to 85° C., in which the differential coefficient (dE'/dT) of the temperature dependent storage modulus which is the modulus obtained by continuously changing the temperature in the measurement of dynamic viscoelasticity is in a range of $-4.0 \times 10^7$ to $-4.3 \times 10^7$, in order to obtain a more remarkable reduction in the shrink starting temperature. That is, when installing resultant films or labels, it is possible to reduce a quantity of heat for shrinking the film, and it is also possible to prevent deformation or deterioration of objects to be coated by excessive heating. It is preferable to obtain a resin composition with a shrink starting temperature in a range of 55 to 75° C., in order to obtain a good balance of properties between the shrink starting temperature and the property to prevent natural shrinkage. It should be noted that the resin composition shows a phase transformation and the inner stress of the resin composition is rapidly released in a temperature range in which the differential coefficients (dE'/dT) are in the above described values.

Various methods may be adopted without limitation to control the temperature, where the differential coefficients (dE'/dT) of the temperature dependent storage modulus in the measurement of the viscoelasticity, are in the range of 50 to 85° C. One method is, for example, to control the temperature by addition of a plasticizer. However, it is preferable to control the temperature by changing the weight ratio of the alkylester acrylate (a-4) having an alkyl group ranging from $C_4$ to $C_8$ in the alkylester (meth)acrylate (a-3).

The shrink film of the present invention formed by the resin composition described above in detail has a maximum shrinking stress according to ASTM D1504 in a range of 1.5 to 5.0 MPa. If the maximum shrinking stress is less than 1.5 MPa, the surface gloss becomes insufficient, and if the stress exceeds 5.0 MPa, the resultant film may undergo natural shrinkage. Thus, it is more preferable for the film to have a stress in a range of 2.0 to 4.5 MPa in order to obtain a good balance of properties. It is noted that the maximum shrinking stress according to ASTM D 1504 is obtained on a hot plate maintained at 200° C.

As hereinabove described, the shrink film of the present invention possesses a proper orientation exhibiting good shrinking properties as well as a superior glossiness. Practically, the glossiness of the film is within a range of 80 to 130%. Conventionally, if the orientation of the film is too high to cause natural shrinkage, the film will show high glossiness. The resultant film of the present invention exhibits glossiness of 80% or more than 80%, which is in the highest level of the glossiness of the film. The present film, therefore, possesses excellent glossiness and excellent shrinking properties, as well as showing excellent mechanical properties such as rigidity and impact resistance.

Although the method of manufacturing the above described shrink film is not limited, it is preferable to adopt the following method developed in the present invention.

The shrink film of the present invention is obtained, by extrusion after melting and kneading the resin composition containing the Resin A as the essential component; drawing in at least one direction in a temperature range from (Tg–5° C.) to (Tg+15° C.), where Tg is the glass transition temperature of the resin composition measured referring to JIS K-7198; and exposing the drawn film in a temperature range from (Tg–50° C.) to (Tg+10° C.).

Practically, the film is obtained from the steps of introducing pellets after melting and kneading the mixture of each constituents into the extruder, extruding the pellets or the mixture after melting and kneading through T-dies or circular dies to form the film. The shrink film of the present invention may be used as a single layered film or as a multi-layered film. When a multi-layered film is used, the film made of the present resin composition containing the Resin A as an essential component is disposed as the inner layer, and various films such as films made of the resin composition containing the Resin A as an essential components, or films made of AS resin, MS resin, or SBS resin ,may be disposed as the outer layer. Such multi-layered films can be produced by co-extrusion of films by a feed block system or by a multi-manifold system.

The temperature of the extrusion process, that is the resin temperature at the time of extrusion, is not necessarily limited, but normally it is preferable to select a temperature rage of 160 to 250° C., and more preferably a range of 200 to 230° C.

The as-extruded sheet is drawn in at least one direction after uniform cooling by an air-knife, touch-roll, or by electrostatic pinning. Although the method of drawing is not limited, it is preferable to draw in one or two directions simultaneously or sequentially. In the case of drawing in one-direction, drawing is performed in the machine direction by using a speed difference between two hot rolls, or drawing mainly in the direction crossing the machine direction at a right angle by use of tenters. The drawing in two directions is performed by first drawing using the speed difference of two hot rolls in the extruding direction and then drawing traversely by using tenters; or by drawing in the perpendicular and lateral directions simultaneously in a tenter.

There are a few methods for drawing the film in one direction. In the drawing by extruding through a circular die, drawing is performed practically in the direction of drawing by the draft while suppressing expansion of bubble, or in the circular direction by expansion of bubbles while suppressing the draft. In the case of drawing in two directions, a method is adopted to draw the film in both extruding and circular directions simultaneously or sequentially, while supplying air in the bubble.

In the present method of manufacturing the film, the drawing expansion is defined as the expansion of the film in the drawing direction, and practically, it is desirable to select a drawing rate in the range of 2.0 to 6.0 times. When the drawing rate is 2.0 or more than 2.0 times, the shrink film acquires favorable properties in preventing wrinkles and slacks during shrink packaging due to the improved maximum shrinkage rate. In contrast, when the drawing rate is 6.0 or less than 6.0 times, the film drawing becomes stable and the productivity of the film increases. From the point of view of balanced properties of the film and optimization of the orientation of the film, the drawing rate is more preferably in the range of 2.5 to 5.5 times, and most preferably, in the range of 3.0 to 4.5 times.

In the present invention, it was found that the optimum temperature range for the drawing process is in a range of (Tg–5° C.) to (Tg+15° C.), where the measured glass transition temperature of this Resin According to JIS K-7198. The lower end of this temperature range for drawing the film is effective to provide the shrink film with improved rigidity, transparency and glossiness. That is, if the drawing temperature is less than (Tg–5° C.), it is almost impossible to draw the film, because softening of the resin is not sufficient for drawing. In contrast, if the drawing temperature is higher than (Tg+15° C.), the drawing cannot be effectively performed due to super-drawing, and at the same time, the transparency and glossiness of the resultant film are degraded due to generation of an uneven surface of the resultant film caused by gum particles. Therefore, it is preferable to select the temperature range for the drawing process to be within the range of (Tg–5° C.) to (Tg+15° C.).

Subsequently, the resin film thus drawn is exposed at a temperature in range of (Tg–50° C.) to (Tg+10° C.) (hereinafter, this process is called "thermal setting process"). This process is effective in drastically improving the property of the film of preventing natural shrinkage, while maintaining high glossiness and high transparency of the resultant film. In addition, this process is effective in providing an excellent coating quality to the shrink film (practical shrinkage). When the temperature of the setting process is less than (Tg–50° C.), the film is fixed without undergoing the thermal setting, while maintaining its high internal stress, so that it is likely that natural shrinkage will occur and the uniformity of the orientation is degraded. In contrast, when the temperature of the setting process exceeds (Tg+10° C.), the stress in the direction of drawing is relaxed so that the shrinking performance is rapidly reduced, and the transparency and the glossiness are degraded because of an uneven surface caused by the gum particles.

The thermal setting process is preferable in that the maximum shrinking stress can be controlled within a appropriate range and that the property to prevent natural shrinking is improved. In that sense, it is more preferable to select a temperature range of (Tg–40° C.) to (TG+10° C.) for the thermal setting process.

The time for the thermal setting ranges from 2 to 80 seconds, and it is more preferable to select a range of 5 to 60 seconds. If the time is less than 2 seconds, the effect of thermal setting is not given to the film, so that the resultant film is inferior in the property to prevent natural shrinkage.

If the time exceeds 80 seconds, the shrinking property and the appearance of the film become degraded due to relaxation of the orientation.

Here, Tg is the glass transition temperature measured referring to the JIS K-7198, and it is the temperature indicating the peak value of tan δ in the main (α) dispersion area which is represented by the ratio of storage modulus in the measurement of dynamic viscoelasticity to the loss modulus.

When the resultant shrink film is used for a material in the fields of thermal shrinking packaging or thermal shrinking labeling, it is preferable for the resultant shrink film to possess a maximum shrinkage rate in a range of 30 to 90% in the drawing direction. When the maximum shrinkage rate is more than 30%, it is possible to perform uniform packaging without generating wrinkles or film-relaxation so that the practical shrinkage rate is satisfactory. In contrast, when the maximum shrinkage rate is less than 90%, it is possible to execute stable drawing of the film. From points of view of obtaining a good balance of properties, a more preferable range is 50 to 85%, and the most preferable range is 60 to 80%.

Here, the shrinkage rate represents a percentage of the shrunk length to the original length of the film after the film is immersed in a silicone oil bath for 10 seconds. The maximum shrinkage rate is the shrinkage rate at which the shrinkage rate reaches to an equilibrium and the shrinkage does not change any more.

The thus obtained shrink films are used for the shrink labels for PET and glass bottles, and also used for the cap-seals and for shrink labels for food-containers.

The present invention will be described in more detail with reference to the following examples, although the scope of the present invention is not limited to the following examples.

SYNTHESIS EXAMPLES 1 AND 2

Two resins A are obtained by the continuous block polymerization using tubular reactors, using two mixtures of ① block copolymer of styrene-butadiene (styrene/butadiene ratio by weight is 37.5/62.5), ② styrene, ③ methylmethacrylate, and ④ n-butyl acrylate, at the respective ratios shown in Table 1. The obtained resins are called "Resin A1" and "Resin A2".

TABLE 1

| components | Resin A1 | Resin A2 |
|---|---|---|
| a-1 | 10.0% | 10.0% |
| a-2 | 48.0% | 48.0% |
| a-3 | 27.0% | 32.0% |
| a-4 | 15.0% | 10.0% |

EXAMPLES 1 TO 11

The resin compositions shown in Tables 2 and 3 were pelletized after melting and kneading at temperatures ranging from 200 to 230° C. The pellets were introduced into an extruder and extruded through a T-type die with a lip gap clearance of 1.0 mm at 230° C., cooled to a temperature of 70 to 80° C. by means of a casting roll unit provided with air knives, and conducting further cooling to the film temperature of 30° C. to form film layers before drawing with a thickness before drawing of 200 μm. These film layers before drawing were then drawn by the tenter under the conditions shown in Tables 2 and 3. The drawn films were transferred to the thermal setting zone, while maintaining the film width, and shrink films with a thickness of 50 μm were obtained after conducting thermal setting.

The MBS resin used as Resin B was obtained by the MBS resin obtained from ① styrene-butadiene block copolymer, ② styrene, and ③ methylmethacrylate at a weight ratio of 60~80/20~40/10~30.

The dynamic viscoelasticity was measured using the pellets obtained by melting and kneading the mixtures shown in Tables 2 and 3.

The measurement of the dynamic viscoelasticity was conducted by using a Viscoelasiticity Measuring Apparatus [RSAII] produced by Rheometrics Scientific Co. at a vibration frequency of 1 Hz. T* shown in Tables 2 and 3 is the temperature at which the differential coefficient of E' in the main dispersion area of the temperature dependent storage modulus E' in the measurement of the dynamic viscoelasticity is $4.1 \times 10^7$ (Pa/° C.). E' retention is the value obtained as the ratio of E' (45° C.) / E'(23° C.) in the measurement of the temperature dependent storage modulus of the dynamic viscoelesticity,

TABLE 2

| Composition | Example 1 | Example 2 | Example 3 | Example 4 | Example 5 |
|---|---|---|---|---|---|
| Resin A | Resin A1 100% | Resin A2 100% | Resin A1 80% | Resin A1 70% | Resin A1 80% |
| Resin B | 0 | 0 | MBS 20% | MBS 30.0% | MBS 20% |
| Plasticizer | | adipates 3.0 parts | | | adipates 3.0 parts |
| Tg (° C.) | 85 | 87 | 88 | 87 | 82 |
| T* (° C.) | 64 | 67 | 67 | 64 | 62 |
| E' retention | 90 | 85 | 88 | 86 | 85 |
| Drawing rate | 4.0 | 4.0 | 4.2 | 4.2 | 4.2 |
| Drawing temp. (° C.) | 95 | 95 | 92 | 92 | 92 |
| Thermal setting time (° C.) | 60 | 60 | 60 | 60 | 60 |
| Thermal setting time (sec.) | 30 | 30 | 30 | 30 | 30 |

The Adipates shown in Table 2 represent polyester-type plasticizers composed of adipates and dihydric alcohols, and the adipates were incorporated in a part of the Resin A obtained as shown in the Examples by kneading by a small biaxial kneader. The mark "%" described in Table 2 and in the later tables indicates the weight percent. The "part" in Table 2 indicates parts by weight to 100 parts of Resin A or Resin B.

TABLE 3

| | Example 6 | Example 7 | Example 8 | Example 9 | Example 10 | Example 11 |
|---|---|---|---|---|---|---|
| Resin A | Resin A1 80.0% | Resin A1 80.0% | Resin A1 80.0% | Resin A1 80.0% | Resin A1 80.0% | Resin A1 80.0% |
| Resin B | MBS 20.0% | MBS 20.0% | MBS 20.0% | MBS 20.0% | MBS 20.0% | MBS 20.0% |
| Plasticizer | 0 | 0 | 0 | 0 | 0 | 0 |
| Tg (° C.) | 87 | 87 | 87 | 87 | 87 | 87 |
| T* (° C.) | 65 | 65 | 65 | 65 | 65 | 65 |
| E' retention (%) | 85 | 94 | 93 | 90 | 93 | 89 |
| Drawing rate | 4.0 | 4.0 | 4.0 | 4.0 | 4.0 | 4.0 |

TABLE 3-continued

| | Example 6 | Example 7 | Example 8 | Example 9 | Example 10 | Example 11 |
|---|---|---|---|---|---|---|
| Drawing temp. | 95 | 97 | 95 | 85 | 90 | 95 |
| Thermal setting temp. (° C.) | 60 | 40 | 95 | 95 | 97 | 45 |
| Thermal setting time (sec.) | 30 | 20 | 30 | 30 | 30 | 30 |

Next, the resultant films were subjected to various property measurements. The results of the measurement are tabulated in Tables 4 and 5.

[Shrink start temperature]

The shrink rate was measured by soaking the film in a silicone-oil bath held at temperatures from 30 to 160° C. for 10 seconds. The shrinkage curve was obtained by obtaining the relationship between the temperature and the shrinkage rate; and the temperature where the shrinkage is 2% was defined as the shrink start temperature.

[Natural shrinking]

The natural shrinkage is the shrinkage of the film after holding in a thermostatic chamber at 35° C. for 30 days.

[Orientation]

The sample films were inserted in between a pair of hot plates heated at 200° C., and the orientation of the film was defined as the maximum thermal shrinking stress of a film which is obtained by dividing the maximum shrinking stress (MPa) by the thickness and the width of the sample film.

Plates: 50 mm length, 5 mm interval

[Haze]

JIS K-7105 referenced test.

[Glossiness]

JIS K-7105 referenced test.

[Impact]

JIS P-8134 (film impact) referenced test.

[Modulus]

JIS P-7127 referenced test.

[Whitening by bending]

The film is bent by 180 degrees and the state after the bent film is inserted through a nipple roll made of isoprene and the state after the bent film is shrunk by heating at 100° C. for 5 sec were visually observed. Results are shown as:

⊚: no change after being bent and shrunk.

○: slight whitening observed after being bent which disappeared after being shrunk.

Δ: beaching and crazing occur by bending, and whitening does not disappear after being shrunk.

X: whitening and cracks occur by bending, and whitening does not disappear after being shrunk.

[Practical shrinking property]

1.5 liter cylindrical PET bottles (maximum circumference of 300 mm) or glass bottles (maximum circumference of 250 mm) were covered by a film which was formed into a cylinder with a diameter of the bottle outer diameter plus 5%, and the bottles were covered with the shrunk film by passing them through a shrinking tunnel. The PET bottles were passed the shrinking tunnel at a temperature of 100° C. for 5 sec, and the glass bottles were passed through the shrinking tunnel of 150° C. for 5 sec. After the shrinking operation, the shrunk film was observed to determine whether the film has wrinkles, and the adhesion of the film. The adhesion is estimated from the ratio of a circumference of the film after shrinking at the bottle neck to the circumference of the bottle neck of the PET or glass bottles (i.e. 130 mm).

[Evaluations]

presence of wrinkles no wrinkles: ○ with wrinkles: X adhesion:

100% . . . ⊚ to 102% . . . ○ to 110% . . . x total evaluation

⊚: the bottle body and bottle neck are both tightly covered.

○: a part of the bottle neck is not sufficiently shrink covered, but can be used in practice.

Δ: a part of the bottle neck is not shrink covered.

X: the covering is not good

TABLE 4

| Items | Example 1 | Example 2 | Example 3 | Example 4 | Example 5 |
|---|---|---|---|---|---|
| Shrink start temp. (° C.) | 65 | 67 | 66 | 65 | 62 |
| Natural shrinkage (%) | 0.5 | 1.0 | 1.0 | 1.0 | 1.0 |
| Max. shrinking stress (MPa) | 4.5 | 4.5 | 4.0 | 4.5 | 4.0 |
| Glossiness (%) | 140 | 140 | 135 | 140 | 135 |
| Haze (%) | 1 | 2 | 3 | 3 | 3 |
| Impact (Kg. cm) | 5 | 5 | 8 | 11 | 9 |
| Modulus (GPa) | 2.1 | 1.9 | 1.8 | 1.7 | 1.5 |
| Whitening by bending | ⊚ | ⊚ | ⊚ | ⊚ | ⊚ |
| Practical Shrinkage/ Wrinkles, PET bottle | ○/⊚ ⊚ | ○/⊚ ⊚ | ○/⊚ ⊚ | ○/⊚ ⊚ | ○/⊚ ⊚ |
| glass bottle | ○/⊚ | ○/⊚ | ○/⊚ | ○/⊚ | ○/⊚ |
| Total evaluation. | ⊚ | ⊚ | ⊚ | ⊚ | ⊚ |

TABLE 5

| Items | Example 6 | Example 7 | Example 8 | Example 9 | Example 10 | Example 11 |
|---|---|---|---|---|---|---|
| Shrink start temp. (° C.) | 64 | 67 | 67 | 66 | 65 | 65 |
| Natural shrinkage (%) | 1.0 | 0.5 | 0.5 | 1.0 | 0.5 | 0.5 |

TABLE 5-continued

| Items | | Example 6 | Example 7 | Example 8 | Example 9 | Example 10 | Example 11 |
|---|---|---|---|---|---|---|---|
| Max. shrinking stress (MPa) | | 4.5 | 2.0 | 2.5 | 3.0 | 2.0 | 2.5 |
| Glossiness (%) | | 135 | 91 | 112 | 119 | 87 | 116 |
| Haze (%) | | 3 | 7 | 5 | 4 | 7 | 4 |
| Impact (Kg. cm) | | 8 | 11 | 10 | 8 | 11 | 9 |
| Modulus (GPa) | | 1.8 | 1.7 | 1.8 | 1.8 | 1.7 | 1.8 |
| Whitening by bending | | ⊙ | ⊙ | ⊙ | ⊙ | ⊙ | ⊙ |
| Practical shrinkage/ Wrinkle, Total evaluation. | PET bottle | o/⊙ | o/o | o/o | o/⊙ | o/o | o/⊙ |
| | glass bottle | ⊙ | o | o | ⊙ | o | ⊙ |
| | | o/⊙ | o/o | o/o | o/⊙ | o/o | o/⊙ |
| | | ⊙ | o | o | ⊙ | o | ⊙ |

COMPARATIVE EXAMPLES 1 TO 6

Various shrink films with the thickness of 50 μm were made by the same steps as those Examples 1 to 11, except that the melting and kneading process was conducted by the same process as those of Examples 3 to 11, and the drawing by the tenter and the thermal setting were executed by the same conditions as those recited in Table 6 (thermal setting was not performed for Comparative Example 6). Tests were made for the thus obtained Comparative Examples. The test results are shown in Table 7.

TABLE 6

| Composition | Comp. Exam. 1 | comp. Exam. 2 | Comp. Exam. 3 | Comp. Exam. 4 | Comp. Exam. 5 | Comp. Exam. 6 |
|---|---|---|---|---|---|---|
| Resin A | Resin A1 80% | Resin A1 80% | Resin A1 80% | Resin A1 80% | Resin A1 80% | Resin A1 80% |
| Resin B | MBS 20% | MBS 20% | MBS 20% | MBS 20% | MBS 20% | MBS 20% |
| Plasticizer | | | | | | |
| Tg (° C.) | 87 | 87 | 87 | 87 | 87 | 87 |
| T* (° C.) | 65 | 65 | 65 | 65 | 65 | 65 |
| E-retension | 95 | 95 | 95 | 95 | 95 | 82 |
| Drawing rate | 4.0 | 4.0 | 4.0 | 4.0 | 4.0 | 4.0 |
| Drawing Temp. (° C.) | 110 | 100 | 95 | 95 | 85 | 95 |
| Therm. setting T (° C.) | 70 | 120 | 110 | 95 | 95 | |
| Therm. setting time (sec) | 30 | 30 | 30 | 30 | 30 | |

TABLE 7

| Items | | Comp. Example 1 | Comp. Example 2 | Comp. Example 3 | Comp. Example 4 | Comp. Example 5 | Comp. Example 6 |
|---|---|---|---|---|---|---|---|
| Shrink start temp. (° C.) | | 67 | 70 | 70 | 67 | | 64 |
| Natural shrinkage (%) | | 0 | 0 | 0 | 0 | | 3 |
| Max. shrinking stress (MPa) | | 1.0 | 0.5 | 0.5 | 1.0 | | 6.0 |
| Glossiness (%) | | 52 | 18 | 32 | 66 | fracture | 150 |
| Haze (%) | | 15 | bleach | bleach | 10 | bleach | 1 |
| Impact (Kg. cm) | | 6 | 5 | 5 | 6 | | 11 |
| Modulus (GPa) | | 1.6 | 1.6 | 1.5 | 1.5 | | 1.8 |
| Whitening by bending | | o | Δ | Δ | o | | o |
| Practical shrinkage/ Wrinkles, Total evaluation | PET bottle | Δ/Δ | x/x | x/x | Δ/Δ | | x/o |
| | glass bottle | Δ | x | x | Δ | | x |
| | | Δ/Δ | x/x | x/x | Δ/Δ | o/o | x/o |
| | | Δ | x | x | Δ | o | x |

The present invention provides a shrink film which is superior in rigidity and mechanical strength, as well as glossiness and in appearance, and which has the property of preventing natural shrinkage.

What is claimed is:

1. A shrink film comprising a resin composition containing a Resin A as an essential component which is obtained by graft polymerization of a gum polymer (a-1), a styrene-based monomer (a-2), and alkylester (meth)acrylate (a-3) such that said gum polymer is incorporated in said Resin A at a ratio of 1 to 20% by weight, wherein the resin composition containing the Resin A has a ratio of E'(45° C.)/E'(23° C.) of the temperature dependent storage modulus (E') obtained in measuring the dynamic viscoelasticity, within a range of 0.85 to 1.00, and the maximum shrinking strees with reference to ASTM D 1504 of said shrink film is within a range of 1.5 to 5.0 MPa.

2. A shrink film according to claim 1, wherein said Resin A is a polymerization product of a combination of two components of alkylester (meth)acrylate comprising methyl (meth)acrylate or ethyl(meth)acrylate and a graft component of alkylesteracrylate which comprises an alkyl group ranging from $C_4$ to $C_8$ and an ester bond.

3. A shrink film according to claim 2, wherein the resin composition comprising the Resin A as an essential component, possesses a temperature range of 50 to 85° C., in which differential coefficients (dE'/dT) of the temperature dependent storage modulus obtained in measuring the dynamic viscoelasticity is within a range of $-4.0 \times 10^7$ to $-4.3 \times 10^7$ Pa/° C.

4. A shrink film according to claim 1, wherein the gum polymer (a-1) is a block copolymer of a styrene-based monomer and a diene-based monomer.

5. A shrink film according to claim 4, wherein the contents of styrene in the gum polymer (a-1) is in a range of 30 to 55% by weight.

6. A shrink film according to any one of claims 2 to 5, wherein the resin composition comprising the Resin A as an essential component contains a Resin B composed of a gum polymer (b-1), a styrene-based monomer (b-2), and an acrylic-based monomer, wherein the Resin B is obtained by graft polymerization such that the gum polymer component (b-1) is more than 30% by weight of the Resin B and wherein the Resin B is introduced at a ratio less than 50% by weight of the Resin A.

7. A shrink film according to claim 1, wherein the resin composition composed of the Resin A as an essential component further comprises plasticizers or smoothening agents.

8. A method of making a shrink film comprising the steps of:

extruding after melting and kneading a resin composition composed of a Resin A as an essential component obtained by the graft polymerization of a gum polymer (a-1), a styrene-based monomer (a-2), and an alkylester (meth)acrylate (a-3) such that said gum polymer is present in the Resin A at ratios of 1 to 20% by weight;

drawing the extruded resin composition in at least one direction at temperatures in a range of (Tg–5° C.) to (Tg+15° C.), where the glass transition temperature of the resin composition measured according to JIS K-7198 is defined as Tg; and exposing the as drawn film at temperatures in a range of (Tg–50° C.) to (Tg+10° C.) for 2 to 80 seconds, wherein the maximum shrinking stress with reference to ASTM D1504 of said shrink film is within the range of 1.5 to 5.0 Mpa.

9. A method of making the shrink film according to claim 8, wherein the ratio of E' (45° C.) /E' (23° C.) of the temperature dependent storage modulus (E') in measurement of the dynamic viscoelasticity of the resin composition is within a range of 0.85 to 1.0.

10. A method of making the shrink film according to claim 9, wherein the Resin A is a polymerization product of a combination of alkylester(meth)acrylate (a-3) comprising methyl(meth)acrylate or ethyl(meth)acrylate and alkylester-acrylate having an alkyl group ranging from $C_4$ to $C_8$ and an ester bond as a graft component.

11. A method of making the shrink film according to claim 10, wherein the resin composition containing the Resin A as an essential component has a temperature range of 50 to 85° C., when the differential coefficient (dE'/dT) of the temperature dependent storage modulus in the measurement of the dynamic viscoelasticity of said resin composition is in a range of $-4.0 \times 10^7$ to $-4.4 \times 10^7$ Pa/° C.

12. A method of making the shrink film according to claim 8, wherein the resin composition containing the Resin A as an essential component further comprises the Resin B which is composed of a gum polymer (b-1), a styrene-based monomer (b-2), and an acrylic-based monomer (b-3), and the Resin B is obtained by a graft polymerization such that the Resin B contains more than 3-% by weight of the gum polymer; and wherein the Resin B is contai ned in the resin composition at an ratio of less than 50% by weight of the Resin A.

13. A method of making the shrink film according to claim 8, wherein the resin composition containing the Resin A as an essential component further comprises plasticizers and smoothening agents.

* * * * *